United States Patent [19]

Hollon

[11] 4,043,568

[45] Aug. 23, 1977

[54] MUD FLAP ASSEMBLY

[76] Inventor: James F. Hollon, Box 533, Milan, Ill. 61264

[21] Appl. No.: 725,911

[22] Filed: Sept. 22, 1976

[51] Int. Cl.² ............................................. B62D 25/16
[52] U.S. Cl. ............................................. 280/154.5 R
[58] Field of Search ................. 280/154.5 R, 154.5 A, 280/153 R

[56] References Cited

U.S. PATENT DOCUMENTS

| | | | |
|---|---|---|---|
| 1,914,977 | 6/1933 | Persons et al. | 280/154.5 R |
| 2,084,087 | 6/1937 | Jackson | 280/154.5 R |
| 3,684,312 | 8/1972 | Evans | 280/154.5 R |
| 3,953,053 | 4/1976 | Arenhold | 280/154.5 R |

Primary Examiner—Robert R. Song
Attorney, Agent, or Firm—Henderson, Strom & Sturm

[57] ABSTRACT

An elongated base having affixed along opposite longitudinal edges thereof rear and front flanges. The rear flange extends upwardly, and the front flange extends downwardly, when the base is horizontally disposed. The rear flange is attached within the rear of a vehicle fender well. A cover strap holds a mud flap upon the front flange, the mud flap depending therefrom and being disposed behind the vehicle wheel. Notches are cut into the base adjacent each end of the base, one notch being larger than the other notch and extending to the inside of the fender well and toward the vehicle frame. Guards are affixed to the mud flap to prevent the mud flap from striking the vehicle exhaust.

3 Claims, 5 Drawing Figures

MUD FLAP ASSEMBLY

BACKGROUND OF THE INVENTION

This invention relates to devices attached to vehicles and employing mud flaps for the purpose of preventing mud, rocks or water spray from being thrown upon following vehicles. A large number of such devices have been devised for semi-tractors and trailers. These structures incorporate anti-sail structures and mounting structures appropriate for semi-tractors and trailers. Such devices are generally too large and unwieldy for small trucks, particularly those manufactured by General Motors Corporation, most particularly the vehicle known as the Blazer.

SUMMARY OF THE INVENTION

A bracket member includes an elongated base, a support flange and a front flange. The support flange is affixed normal to the base at the rear longitudinal edge of the base, and the front flange is affixed normal to the base at the front longitudinal edge of the base. The support flange extends upwardly, and the front flange downwardly, when the base is horizontally disposed. Two notches or cut-out portions are formed in the base, each notch being formed at one end of the base and extending toward the rear of the base such that the rear longitudinal edge is shorter than the front longitudinal edge. One notch is somewhat longer than the other notch.

The support flange is detachably affixed to the inside of a fender well of a vehicle. A mud flap is held against the front flange by a cover strap detachably affixed to the front flange. The mud flap extends downwardly behind a wheel of the vehicle. Guard members are attached to the rear side of the mud flap and catch the vehicle exhaust when the mud flap bends backwards, thereby protecting the mud flap.

It is an object of this invention to provide a mud flap assembly which can be easily attached to or removed from the fender well of a vehicle.

Another object of this invention is to provide a mud flap assembly which can easily be adjusted to a level position upon the vehicle and replaced when worn out.

Still another object of this invention is to provide a mud flap assembly which is protected against being damaged by the exhaust system of the vehicle.

A further object of this invention is to provide a mud flap assembly which is adapted for small trucks, particularly the truck manufactured by General Motors Corporation and known as the Blazer, and which achieves the foregoing objects.

These objects and other features and advantages of the mud flap assembly of this invention will become readily apparent upon referring to the following description, when taken in conjunction with the appended drawings.

BRIEF DESCRIPTION OF THE DRAWING

The mud flap assembly of this invention is illustrated in the drawing wherein.

DESCRIPTION OF THE PREFERRED EMBODIMENT

Figure 1:
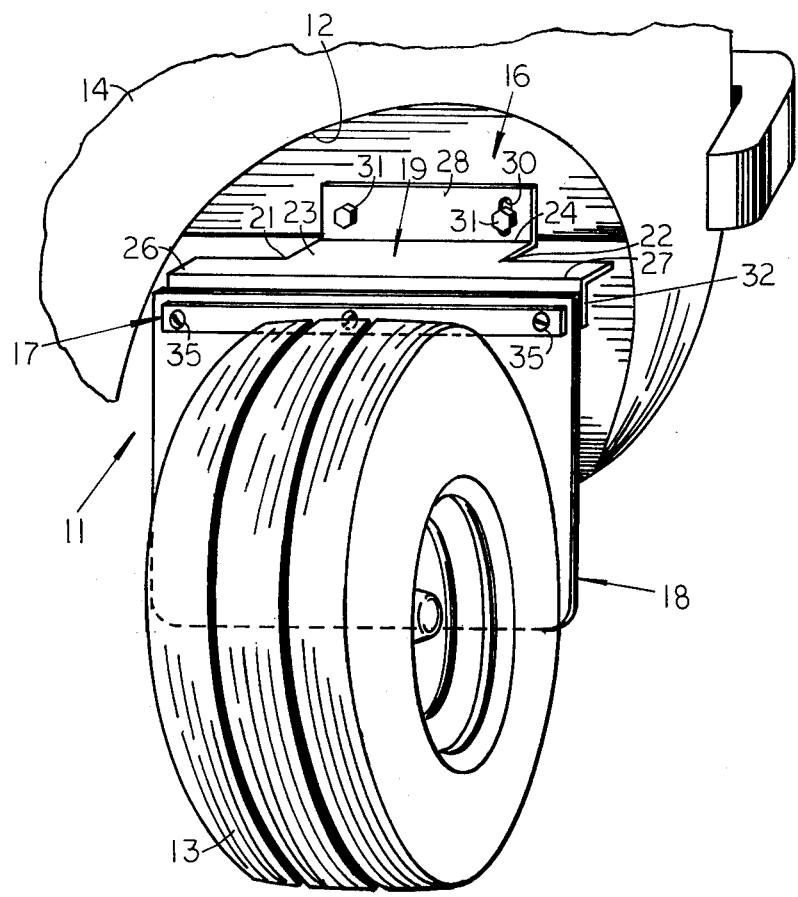
FIG. 1 is a fragmentary, perspective view of the mud flap assembly disposed within the fender well of a truck.

The mud flap assembly of this invention is indicated generally at 11 in FIG. 1 disposed within the fender well 12, and behind a rear tire 13, of a truck 14. The mud flap assembly 11 more particularly includes a bracket member 16, a cover strap 17 and a flap 18.

Figure 2:
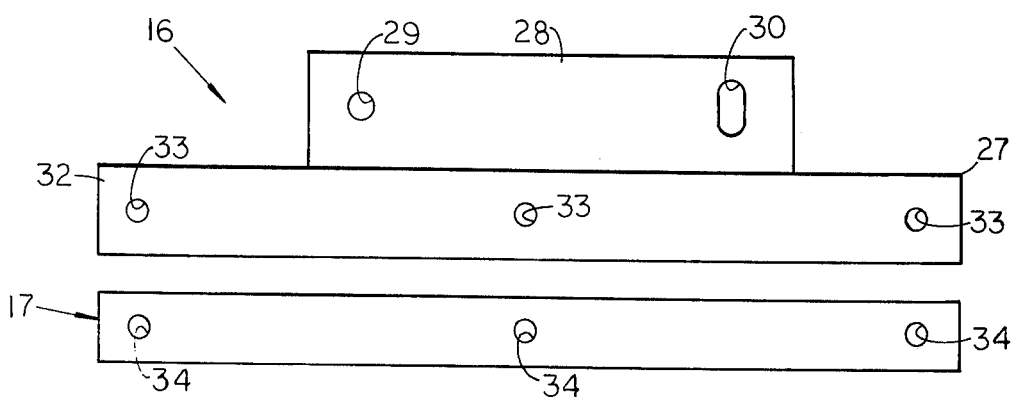
FIG. 2 is an enlarged, front elevational view of the bracket and hold-down strap of the mud flap assembly.
Figure 3:
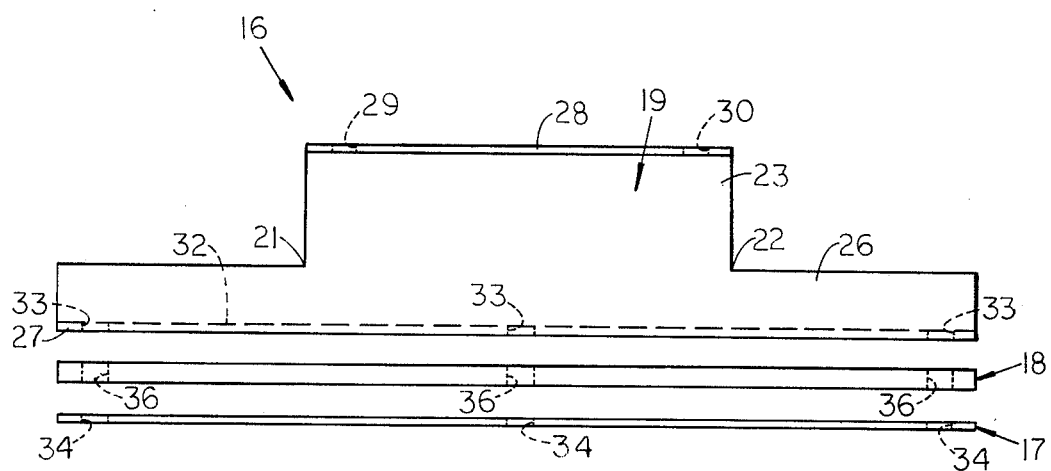
FIG. 3 is an enlarged, top plan view of the bracket and hold-down strap.

Referring to FIGS. 2 and 3, the bracket member 16 includes a generally horizontally disposed base 19. Large and small portions 21, 22 are cut out of the base 19 such that a rearward projection 23, having a rear longitudinal edge 24, is formed. The rearward projection 23 joins an elongated forward portion 26 intermediate the ends of the portion 26. The forward portion 26 has a front longitudinal edge 27. An upright support flange 28 is attached normal to the base 19 at the rear longitudinal edge 24. A circular aperture 29, and an aperture 30 which is elongated along its vertical axis, are formed through the flange 28. Bolts 31 are received through the apertures 29, 30. A depending flange 32, having a plurality of apertures 33 formed therethrough, is attached normal to the base 19 at the front longitudinal edge 27.

The cover strap 17, FIGS. 2 and 3, is an elongated, substantially rectangular, plate. A plurality of apertures 34 are formed through the strap 17. Bolts 35 (FIG. 4) are received through the apertures 34.

Figure 4:
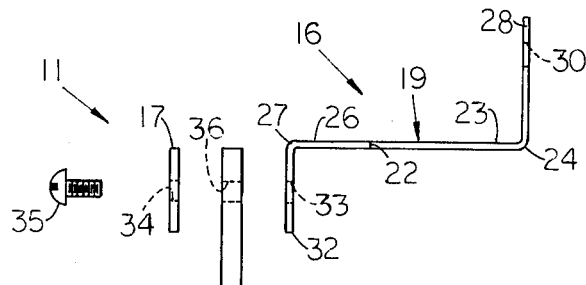
FIG. 4 is enlarged, foreshortened, exploded side elevational view of the mud flap assembly showing alternate embodiments of a portion thereof.
Figure 5:
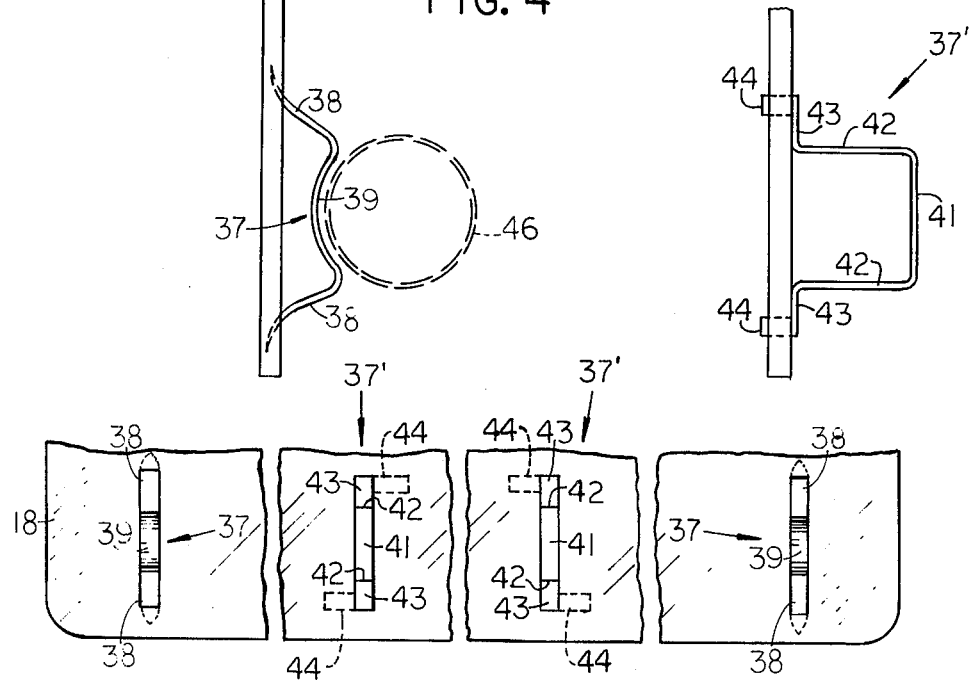
FIG. 5 is an enlarged, foreshortened, fragmentary rear elevational view of the mud flap showing alternate embodiments of a portion thereof.

The flap 18, FIGS. 4 and 5, is elongated, substantially flat when viewed from the side and rectangular when viewed from the front or rear. A plurality of holes 36 are formed through the flap 18 adjacent the upper end thereof. A plurality of vertically disposed, transversely spaced, guard members 37 are affixed to the rear of the flap 18. Each guard member 37 includes upper and lower arcuate legs 38, which engage the flap 18, and an arcuate transverse section 39 which interconnects the legs 38. The transverse section 39 curves inwardly toward the flap 18. The arcuate legs 38 curve inwardly toward each other and into the space enclosed by the guard member 37.

An alternate form of guard member is shown at 37' in FIGS. 4 and 5. The modified guard member 37' includes a transverse portion 41 which interconnects parallel leg portions 42. Each leg portion 42 is contiguous with a base portion 43. The base portions 43 are parallel to the transverse portion 41 and normal to the leg portions 42, rest upon the rear surface of the flap 18, and extend in opposite directions, one upwardly and one downwardly. Fastening portions 44 are contiguous with each of the base portions 43. Each fastening portion 44 extends normal to the base portion 43 and directly through the flap 18 and then extends in a horizontal direction upon the front surface of the flap 18. The fastening portions 44 of each guard member 37' extend horizontally in opposite directions upon the front surface of the flap 18.

When the mud flap assembly 11 is attached to a truck 14, bolts 31 are passed through the apertures 29, 30 of the support flange 28 and into the rear of the fender well 12. The assembly 11 is pivoted about the bolt 31 passed through aperture 29, the other bolt 31 being movable within the elongated aperture 30, such that the assembly 11 is leveled. The bolts 31 are then tightened into the fender well 12, the flap 18 being suspended therefrom in a position behind the wheel 13.

The flap 18 is held between the bracket member 16 and the hold-down strap 17. Bolts 35 pass through the apertures 34 of the strap 17, the holes 36 of the flap 18 and the apertures 33 of the bracket 16. When the bolts 35 are tightened, the strap 17 holds the flap 18 against the depending flange 32. The flap 18, when worn out, therefore can be easily replaced merely by operation of the bolts 35. Also, to facilitate attachment of the assembly 11 to the fender well 12, the bracket member 16 may first be attached to the fender well 12 and thereafter the strap 17 and flap 18 attached to the bracket 16.

The guard members 37 operate to keep the flap 18 from striking the exhaust 46 of the truck 14. The exhaust 46 is caught and cradled by the arcuate transverse sections 39 of the guard members 37 when the flap 18 bends rearwardly.

The assembly 11 illustrated herein is a left-side version, the positions of the large and small cut-out portions 21, 22 being reversed in the right-side version. The large portion 21 is always disposed toward the inside, or frame side, of the fender well 12. The elongated forward portion 26 has a length of 13½ inches (34.3 cm), the large portion 21 having a length of 3½ inches (8.89 cm), the small portion 22 having a length of 3 inches (7.62 cm) and both portions 21, 22 having a width of 2 inches (5.08 cm). The distance between the rear and front longitudinal edges 24, 27 is 3 inches (7.62 cm). The width (vertical dimension) is 2 inches (5.08 cm) for the support flange 28 and 1 inch (2.54 cm) for the depending flange 32. The configuration of the base 19 in particular results in the assembly 11 being the only structure of its general type which adequately fits the truck 14 manufactured by General Motors and known as the Blazer.

It can be seen that the mud flap assembly 11 can be easily attached to or detached from the fender well 12 of a truck 14. The assembly 11 may easily be adjusted to a level position upon the truck 14. The flap 18 is easily replaced when worn out. The flap 18 is protected against damage from the exhaust 41 of the truck 14. Also, the assembly 11 quite adequately fits the truck 14 known as the Blazer. Furthermore, although a preferred embodiment has been disclosed herein, it is to be remembered that various modifications and alternate constructions can be made thereto without departing from the full scope of the invention, as defined in the appended claims.

I claim:

1. A mud flap assembly, for attachment to a vehicle known as the Blazer, the Blazer having a body attached over a frame mounted on wheels, the body having fender wells formed therein about the wheels, said assembly comprising:

an elongated cover strap;
   an elongated mud flap;
   bracket means for supporting said mud flap, said bracket means including a base member and first and second flanges, said base member having front and rear longitudinal edges, said first flange being attached at said rear longitudinal edge normal to said base member, said second flange being attached at said front longitudinal edge normal to said base member, said first and second flanges extending to opposite sides of said base member, said base member having first and second cut-out portions formed therein, said base member having disposed at each end thereof one of said cut-out portions and directed toward the rear thereof both of said cut-out portions, whereby said rear longitudinal edge is made shorter than said front longitudinal edge, said first cut-out portion being longer than said second cut-out portion; and
   said first flange being detachably affixed within a fender well and behind a wheel of the vehicle, said first cut-out portion extending to the inside of the fender well toward the frame, said mud flap being placed against said second flange, said cover strap being detachably affixed to said second flange over said mud flap, said mud flap being held between said cover strap and said second flange and depending therefrom and behind the wheel.

2. A mud flap assembly as defined in claim 1 and further wherein said first flange has first and second apertures formed therethrough, said first and second apertures being horizontally spaced, said second aperture being elongated in the vertical direction, said first flange further including a pair of bolts, said bolts being removably passed through said apertures to detachably affix said bracket means within a fender well, said bracket means being pivotable about said bolt passed through said first aperture, whereby the bracket means may be adjusted to a level disposition.

3. A mud flap assembly as defined in claim 1 and further wherein the vehicle includes an exhaust disposed adjacent the rear of a fender well, said mud flap including attached normal to the rear side thereof a plurality of horizontally spaced guard members, each of said guard members being continuously formed and disposed in a vertical plane, each of said guard members including a pair of legs and a transverse member, said legs engaging said mud flap, said transverse member joining said legs, said transverse member being arcuate in conformation and curving toward said mud flap, the exhaust being cupped by said transverse member when said mud flap bends rearwardly.

* * * * *